(12) United States Patent
Zwisler et al.

(10) Patent No.: US 9,170,740 B2
(45) Date of Patent: Oct. 27, 2015

(54) SYSTEM AND METHOD FOR PROVIDING IMPLICIT UNMAPS IN THINLY PROVISIONED VIRTUAL TAPE LIBRARY SYSTEMS

(75) Inventors: Ross Zwisler, Lafayette, CO (US); Brian McKean, Longmont, CO (US); Kevin Kidney, Lafayette, CO (US)

(73) Assignee: NetApp, Inc., Sunnyvale, CA (US)

( * ) Notice: Subject to any disclaimer, the term of this patent is extended or adjusted under 35 U.S.C. 154(b) by 271 days.

(21) Appl. No.: 12/851,641

(22) Filed: Aug. 6, 2010

(65) Prior Publication Data

US 2012/0036321 A1 Feb. 9, 2012

(51) Int. Cl.
*G06F 12/08* (2006.01)
*G06F 3/06* (2006.01)
*G06F 12/16* (2006.01)

(52) U.S. Cl.
CPC .............. *G06F 3/0608* (2013.01); *G06F 3/064* (2013.01); *G06F 3/0686* (2013.01); *G06F 12/08* (2013.01)

(58) Field of Classification Search
CPC ...................................................... G06F 12/08
USPC ........................................................ 711/114
See application file for complete search history.

(56) References Cited

U.S. PATENT DOCUMENTS

| 6,477,612 | B1* | 11/2002 | Wang ................................. 711/2 |
| 7,065,630 | B1* | 6/2006 | Ledebohm et al. ........... 711/206 |
| 7,620,765 | B1* | 11/2009 | Ohr et al. ........................... 711/4 |
| 2008/0005468 | A1 | 1/2008 | Faibish et al. |
| 2008/0140730 | A1* | 6/2008 | Toshine ......................... 707/200 |
| 2009/0070541 | A1* | 3/2009 | Yochai ........................... 711/165 |
| 2009/0222596 | A1* | 9/2009 | Flynn et al. ..................... 710/22 |
| 2009/0300302 | A1 | 12/2009 | Vaghani |
| 2011/0320679 | A1* | 12/2011 | Ashton et al. ..................... 711/4 |

OTHER PUBLICATIONS

International Searching Authority—United States, PCT Notification of Transmittal of the International Search Report and the Written Opinion of the International Searching Authority, or the Declaration mailed Dec. 19, 2011, PCT Appl. No. PCT/US2011/046823, 8 pages Alexandria, VA.

* cited by examiner

*Primary Examiner* — Sanjiv Shah
*Assistant Examiner* — Gautam Sain
(74) *Attorney, Agent, or Firm* — Haynes and Boone, LLP

(57) ABSTRACT

The present invention is a system and method which allows for a VTL system that supports thin provisioning to implicitly unmap unused storage. Such unmap operations may occur even though the VTL system does not receive any explicit unmap requests from its initiators. For example, if a system administrator knows that once a virtual tape drive of the VTL system has been partially overwritten, all previously written data sets on that virtual tape drive will never again be accessed, the system administrator may configure the VTL system so that it unmaps the entire remainder of the virtual tape drive on the first data overwrite.

18 Claims, 4 Drawing Sheets

SYSTEM AND METHOD FOR PROVIDING IMPLICIT UNMAPS IN THINLY PROVISIONED VIRTUAL TAPE LIBRARY SYSTEMS

FIELD OF THE INVENTION

The present invention relates to the field of data management via data storage systems and particularly to a system and method for providing implicit unmaps in thinly provisioned virtual tape library systems.

BACKGROUND OF THE INVENTION

Currently available data storage systems/methods for providing data management in data storage systems may not provide a desired level of performance.

Therefore, it may be desirable to provide a data storage system/method(s) for providing data management in a data storage system which addresses the above-referenced shortcomings of currently available solutions.

SUMMARY OF THE INVENTION

Accordingly, an embodiment of the present invention is directed to a method for data handling in a thinly-provisioned virtual tape library (VTL) system, said method including: receiving a first write command; based upon said received first write command, writing a first data set to a first portion of Logical Block Addressing (LBA) space of a virtual tape drive of the VTL system; mapping the first portion of LBA space of the virtual tape drive to physical storage of the VTL system; receiving a second write command; based upon said received second write command, writing a second data set to a second portion of LBA space of the virtual tape drive of the VTL system; mapping the second portion of LBA space of the virtual tape drive to physical storage of the VTL system; receiving a third write command; based upon said received third write command, writing a third data set to the first portion of LBA space, wherein writing the third data set to the first portion of LBA space includes overwriting at least a portion of the first data set; and unmapping from physical storage at least one of: LBA space occupied by non-overwritten data of the first data set; and LBA space occupied by the second data set.

A further embodiment of the present invention is directed to a non-transitory computer-readable medium having computer-executable instructions for performing a method for data handling in a thinly-provisioned virtual tape library (VTL) system, said method including: receiving a first write command; based upon said received first write command, writing a first data set to a first portion of Logical Block Addressing (LBA) space of a virtual tape drive of the VTL system; mapping the first portion of LBA space of the virtual tape drive to physical storage of the VTL system; receiving a second write command; based upon said received second write command, writing a second data set to a second portion of LBA space of the virtual tape drive of the VTL system; mapping the second portion of LBA space of the virtual tape drive to physical storage of the VTL system; receiving a third write command; based upon said received third write command, writing a third data set to the first portion of LBA space, wherein writing the third data set to the first portion of LBA space includes overwriting at least a portion of the first data set; and unmapping from physical storage at least one of: LBA space occupied by non-overwritten data of the first data set; and LBA space occupied by the second data set.

A still further embodiment of the present invention is directed to a thinly-provisioned virtual tape library (VTL) system which is configured for providing implicit unmapping based upon partial overwriting of data sets of the VTL system.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Virtual tape library (VTL) systems emulate tape storage systems, using disk drives for their storage. Thin provisioning is a technology used in storage systems to allow an administrator to configure more storage than is actually available. When a thinly provisioned volume is first created, it typically starts out with all of its storage unmapped, meaning that its Logical Block Addressing (LBA) space is not backed by any physical storage. As the LBA space in the thinly provisioned volume is written, it is mapped to underlying physical storage. As time goes on and more areas of the LBA space receive write commands, increasing amounts of the LBA space become mapped to underlying physical storage. Because of the desire to conserve physical storage space, it is advantageous to have as little physical storage space mapped to LBA space as possible. For this reason, many interfaces used to access thinly provisioned storage devices include commands which allow LBA space to become unmapped from physical storage. After it is unmapped, physical storage space may be added back to the storage system's free pool. This action makes the physical storage space available to be remapped later, possibly for a different LBA range or set of LBA ranges. Depending on the configuration, this unmapped physical storage may even be remapped to different volumes found within the storage system. The SCSI Stream Commands (SSC) specification, which is a specification that is followed by tape storage systems (and thus, by the VTL systems which emulate them), does not provide support for unmapping LBA space from physical storage space. This approach makes sense for physical tape drive storage systems, but for VTL systems, there may be an opportunity to unmap unused storage space. For example, a VTL system (ex.—VTL storage system) implementing thin provisioning may have difficulty unmapping unused storage space because the tape interface it exports to initiators does not support thin provisioning. In such cases, the VTL storage system may be able to recognize that an overwrite at the beginning of a data set typically invalidates some additional data on the remainder of the virtual tape. Thus, the VTL system may then be able to implicitly unmap the newly invalidated data.

The system(s) and method(s) of the present invention disclosed herein may allow for a VTL system that supports thin provisioning to implicitly unmap unused storage. Such unmap operations may occur even though the VTL system does not receive any explicit unmap requests from its initiators.

Figure 1:
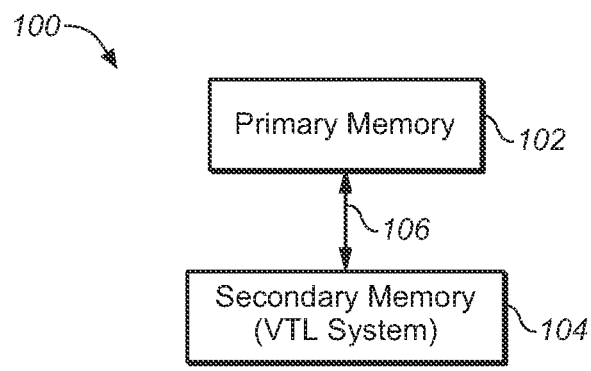
FIG. 1 is a block diagram schematic of a computer system in accordance with an exemplary embodiment of the present invention.

Referring to FIG. 1, a computer system 100 in accordance with an exemplary embodiment of the present invention is shown. In current exemplary embodiments of the present invention, the computer system 100 may include a primary memory 102. For example, the primary memory 102 may be Random Access Memory (RAM), Flash memory, a plurality of hard disk drives, and/or the like. In further embodiments of the present invention, the computer system 100 may further include a secondary memory 104. For instance, the secondary memory 104 may be a Virtual Tape Library (VTL) system 104. In still further embodiments of the present invention, the secondary memory 104 (ex.—the VTL system 104) and the primary memory 102 may be communicatively coupled to each other via a storage interface 106.

Figure 2:
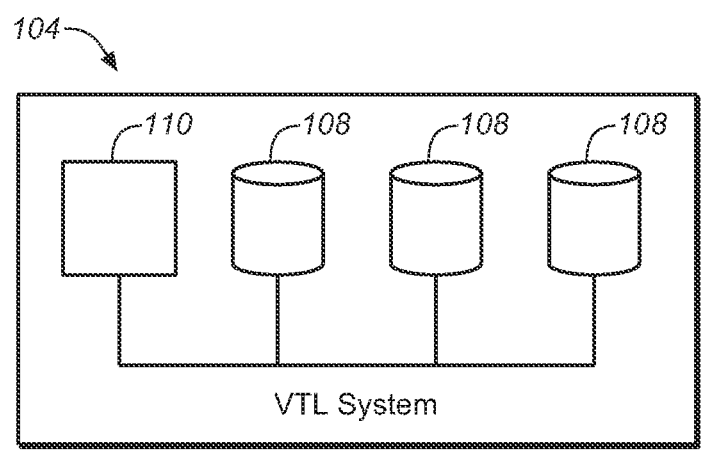
FIG. 2 is a block diagram schematic of a virtual tape library (VTL) system of the computer system shown in FIG. 1 in accordance with an exemplary embodiment of the present invention.

In exemplary embodiments of the present invention, the VTL system 104 (as shown in FIG. 2) may include a plurality of hard disk drives 108. For example, the plurality of hard disk drives 108 of the may include Parallel Advanced Technology Attachment (PATA) disk drives, Serial Advanced Technology Attachment disk drives, and/or the like. In further embodiments of the present invention, the VTL system 104 further includes a storage controller 110, said storage controller 110 being connected to the plurality of hard disk drives 108 of the VTL system 104, said storage controller 110 being connected to the primary memory 102 via the storage interface 106.

Figure 3:
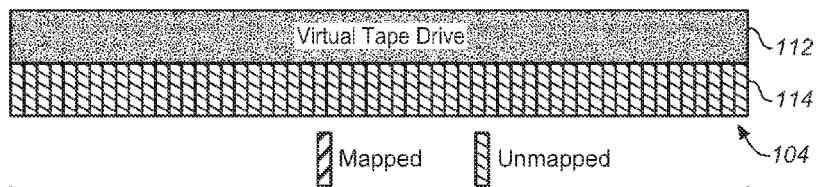
FIG. 3 is a block diagram schematic of the VTL system shown in FIG. 2, said VTL system being a thinly-provisioned VTL system, said thinly-provisioned VTL system being depicted in an initial state where all of its Logical Block Addressing (LBA) space is unmapped in accordance with an exemplary embodiment of the present invention.

In current exemplary embodiments of the present invention, the computer system 100 may be configured for backing up data which is stored in the primary memory 102 by directing write commands to the secondary memory 104 (ex.—the VTL system 104). In further embodiments, the write commands include requests for data blocks included in said data to be written to the secondary memory 104. In still further embodiments of the present invention, the VTL system 104 (as shown in FIG. 3) is configured for presenting its storage component (ex.—the plurality of disk drives 108) to the computing system 100 (ex.—to the primary memory 102) as one or more virtual tape drives 112. In further embodiments, the plurality of disk drives 108 may be presented to the computing system 100 as a series of contiguous addresses which form a Logical Block Addressing (LBA) space 114 of the tape drive 112 (as shown in FIG. 3).

In exemplary embodiments of the present invention, the VTL system 104 (as shown in FIG. 3) may be configured for supporting thin provisioning (ex.—may present its storage 108 as a thinly provisioned virtual tape drive 112. In further embodiments of the present invention, the thinly provisioned virtual tape drive 112 may start out with all of its LBA space 114 unmapped. (ex.—the thinly provisioned virtual tape drive 112 may initially be in a state of operation where none of its LBA space 114 is mapped to the disk drives 108 of the VTL system 104) (as shown in FIG. 3). In still further embodiments of the present invention, the VTL system 104 may be configured for receiving a plurality of write commands from the computer system 100, said write commands requesting that data from the primary memory 102 be written to the VTL system 104. In further embodiments of the present invention, based upon the received write commands, the VTL system 104 may write data from the primary memory 102 to the LBA space 114 of the thinly-provisioned VTL tape drive 112. For instance, writes operations (ex.—writes) performed by the VTL system 104 may start at a beginning of the virtual tape drive 112 and may continue sequentially until the virtual tape drive 112 is filled with data (ex.—until an amount of data equal to a maximum data capacity of the LBA space 114 has been written to the LBA space 114).

Figure 4:
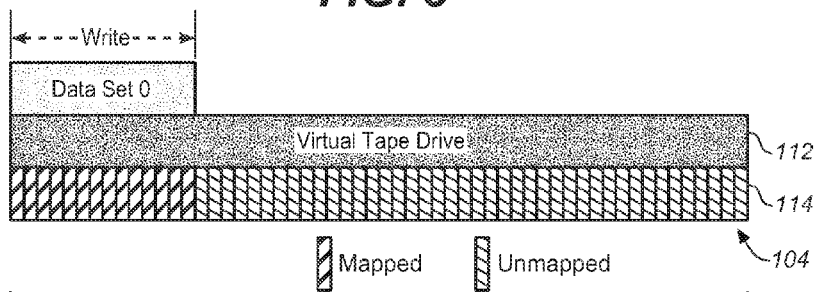
FIG. 4 is a block diagram schematic of a thinly-provisioned VTL system, wherein a first data set has been written to LBA space of the VTL system and said LBA space occupied by said first data set has been mapped to physical storage of the VTL system in accordance with an exemplary embodiment of the present invention.
Figure 5:
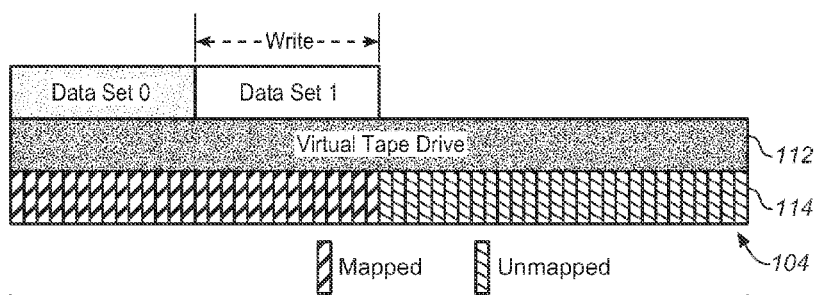
FIG. 5 is a block diagram schematic of a thinly-provisioned VTL system, wherein a first data set and a second data set have been written to LBA space of the VTL system and said LBA space occupied by said first data set and said second data set has been mapped to physical storage of the VTL system in accordance with an exemplary embodiment of the present invention.
Figure 6:
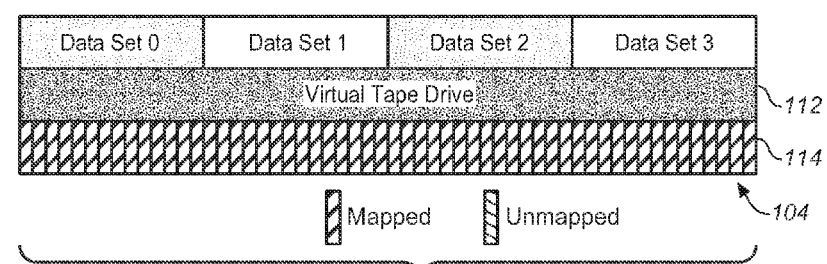
FIG. 6 is a block diagram schematic of a thinly-provisioned VTL system, wherein four data sets have been written to LBA space of the VTL system and said LBA space occupied by the four data sets has been mapped to physical storage of the VTL system in accordance with an exemplary embodiment of the present invention.

In current exemplary embodiments of the present invention, the writes performed by the VTL system 104 may be divided into one or more sequentially written data sets, each data set spanning some non-zero number of adjacent blocks (ex.—data blocks) in the LBA space 114 of the virtual tape drive 112. For example, a first write operation performed by the VTL system 104 may include writing a first data set ("Data Set 0") to LBA space 114 (as shown in FIG. 4). In further embodiments of the present invention, after the first data set ("Data Set 0") is written to the LBA space 114, or alternatively, as the first data set ("Data Set 0") is being written to the LBA space 114, the VTL system 104 may be configured for mapping the LBA space 114 occupied by the first data set to the underlying physical storage (ex.—the hard disk drives 108) of the VTL system 104. In still further embodiments of the present invention, the VTL system 104 may perform further write operations for writing additional data sets ("Data Set 1", Data Set 2" and "Data Set 3") to the LBA space 114 of the virtual tape drive (as shown in FIGS. 5 and 6). In further embodiments of the present invention after the additional data sets ("Data Set 1", Data Set 2" and "Data Set 3") are written to the LBA space 114, or alternatively, as the additional data sets ("Data Set 1", Data Set 2" and "Data Set 3") are being written to the LBA space 114, the VTL system 104 may be configured for mapping the LBA space 114 occupied by the additional data sets to the underlying physical storage (ex.—the hard disk drives 108) of the VTL system 104. In still further embodiments of the present invention, once the virtual tape drive 112 has been filled (ex.—fully written), the end result is that all of the LBA space 114 of the virtual tape drive 112 is mapped (ex.—will have been mapped) to the underlying physical storage 108 of the VTL system 104 (as shown in FIG. 6). In further embodiments of the present invention, the VTL system 104 may be further configured for writing the data sets from the virtual tape drive 112 to the hard drives 108 of the VTL system 104.

Figure 7:
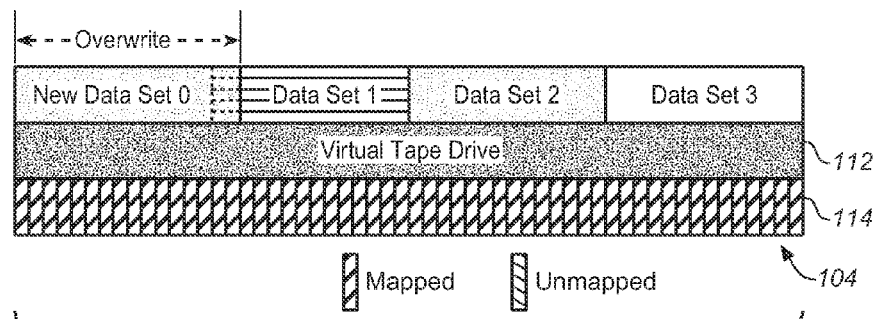
FIG. 7 is a block diagram schematic of the thinly-provisioned VTL system shown in FIG. 6, wherein the first of the four data sets has been completely overwritten and the second of the four data sets has been partially overwritten by a new data set in accordance with an exemplary embodiment of the present invention.

A typical usage pattern for tapes is to write some number of data sets to them, then to store them in case the data contained in those data sets is needed. After some time has elapsed, and subsequent backups have been made to other tapes, the tape may be re-used. This is done by simply overwriting the existing data sets found on the tape. In exemplary embodiments of the present invention, the thinly provisioned VTL system 104 may be configured for determining that, when a data set is partially overwritten (some but not all of the data in that data set is overwritten), the rest of the data in that data set may be invalid. Consequently, the VTL system 104 may be configured for determining that because the rest of the data in that data set is invalidated due to the partial overwrite of that data set, that said VTL system 104 can go ahead and implicitly unmap LBA space 114 occupied by the remaining data in that data set from the underlying physical storage 108 of the VTL system 104. For example, in one embodiment of the present invention, (as shown in FIG. 7) an overwrite may be performed by the VTL system 104 in which an additional data set (ex.—an overwrite data set ("New Data Set 0")) is written to the LBA space 114 of the virtual tape drive 112 (ex.—a filled or fully-written virtual tape drive 112). For instance, the overwrite data set ("New Data Set 0") may fully overwrite the first data set ("Data Set 0") (ex.—may overwrite or span all of the LBA space 114 which was previously occupied by the first data set ("Data Set 0") and may partially overwrite the second data set ("Data Set 1") (ex.—may partially overwrite or partially span LBA space which was previously occupied by the second data set ("Data Set 1").

Figure 8:
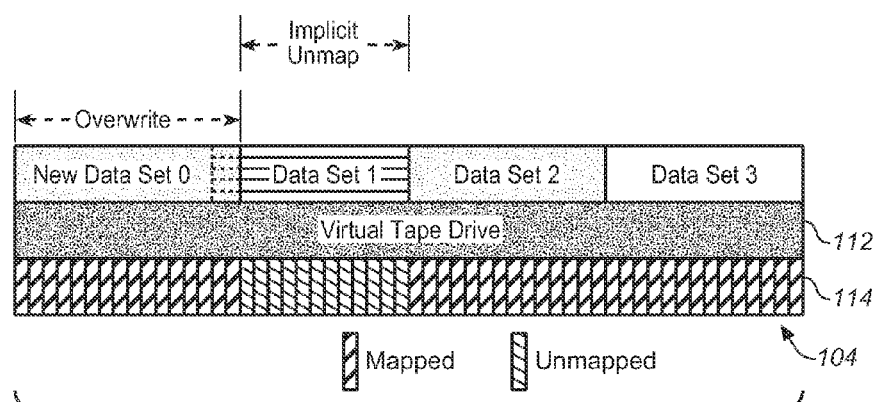
FIG. 8 is a block diagram schematic of the thinly-provisioned VTL system shown in FIG. 7, wherein the LBA space occupied by the non-overwritten portion of the second data set is implicitly unmapped from physical storage of the VTL system in accordance with an exemplary embodiment of the present invention.
Figure 9:
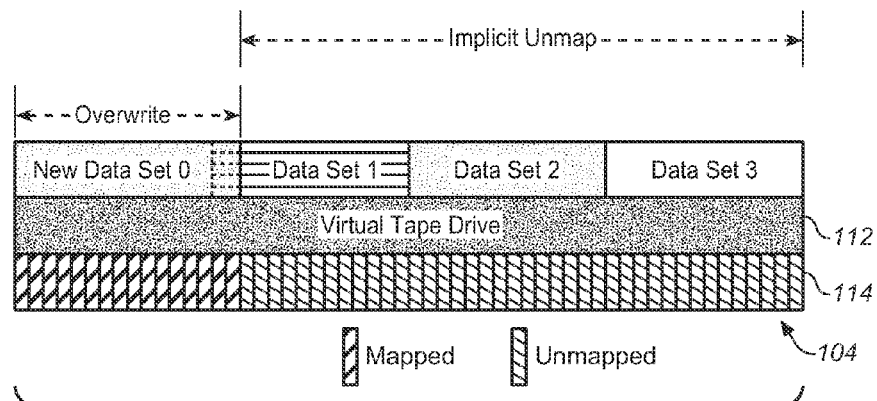
FIG. 9 is a block diagram schematic of the thinly-provisioned VTL system shown in FIG. 7, wherein the LBA space occupied by the non-overwritten portion of the second data set and the LBA space occupied by the third and fourth data sets is implicitly unmapped from physical storage of the VTL system in accordance with an alternative exemplary embodiment of the present invention.

In further embodiments of the present invention (as shown in FIG. 8), the VTL system 104 may be configured for determining when a data set has been partially overwritten (and/or when LBA space 114 occupied by the data set has been partially overwritten) and may further be configured, based upon said determination, for unmapping the non-overwritten data of the partially overwritten data set from the physical storage 108 (or unmapping LBA space 114 occupied by the non-overwritten data of the partially overwritten data set from the physical storage 108). In alternative embodiments of the present invention (as shown in FIG. 9), the VTL system 104 may be configured for determining when a data set has been partially overwritten (or when LBA space 114 occupied by the data set has been partially overwritten) and may further be configured, based upon said determination, for unmapping all of the non-overwritten data of the virtual tape drive (and/or unmapping all of the LBA space 114 of the virtual tape drive 112 which is occupied by the non-overwritten data) from the underlying physical storage 108. For example, as shown in FIG. 9, if the virtual tape drive 112 is filled (ex.—fully written) with the four data sets ("Data Set 0", "Data Set 1", "Data Set 2" and "Data Set 3"), and a fifth data set ("New Data Set 0" is written to the virtual tape drive 112, said fifth data set completely overwriting the first data set ("Data Set 0") and partially overwriting the second data set ("Data Set 1"), the VTL system 104 may be configured for unmapping not only the LBA space 114 occupied by the partially overwritten second data set ("Data Set 1"), but also the LBA space 114 occupied by the remaining (ex.—non-overwritten) data sets on the virtual tape drive 112 (ex.—the third data set ("Data Set 2") and the fourth data set ("Data Set 3")). Such configuration may be advantageous when a system administrator knows beforehand that any partial overwrite to the virtual tape drive 112 will result in all previously written data sets on that virtual tape drive 112 never again being accessed.

Figure 10:
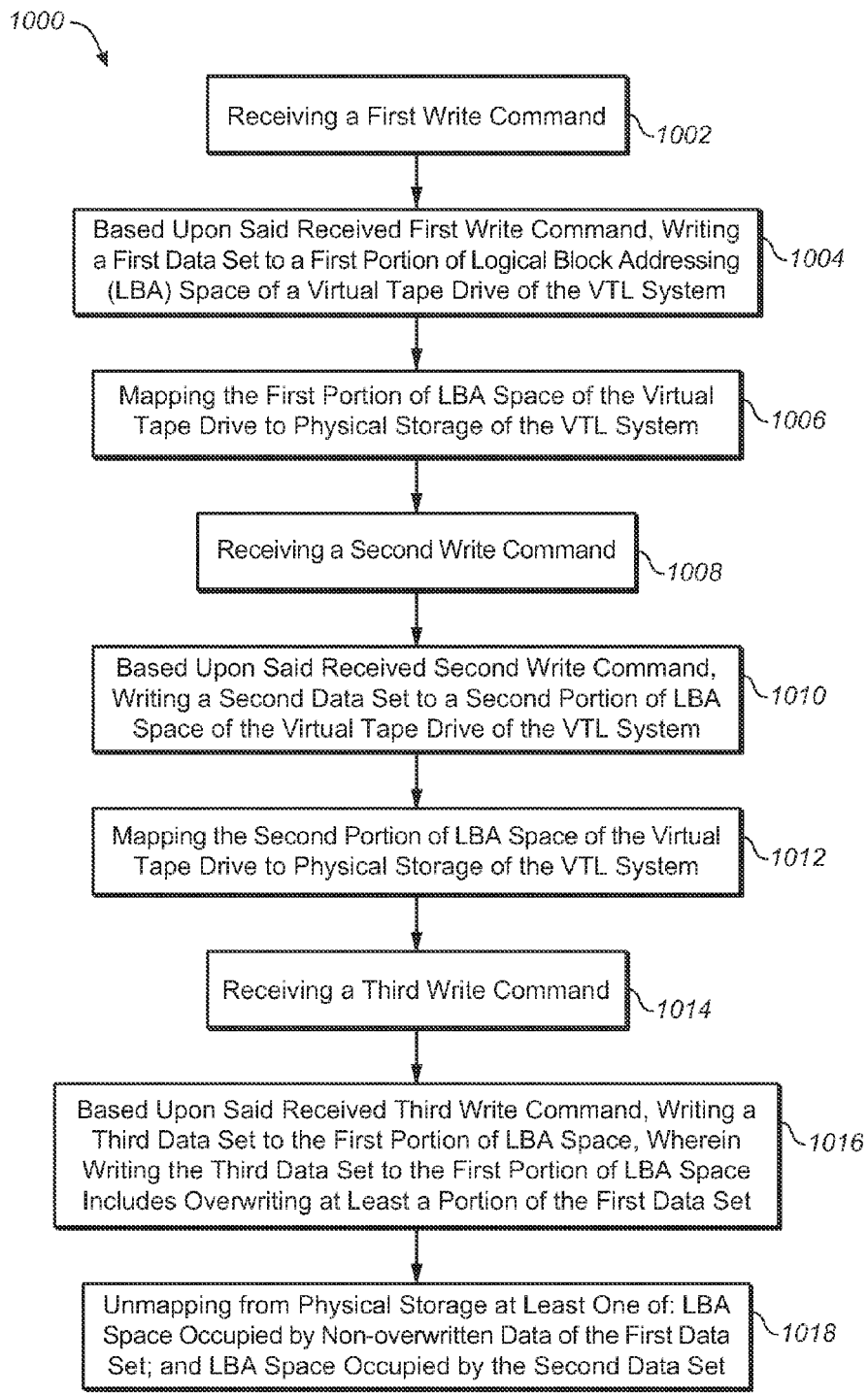
FIG. 10 is a flow chart illustrating a method for data handling in a VTL system in accordance with a further exemplary embodiment of the present invention.

Referring to FIG. 10, a flowchart is provided which illustrates a method for data handling in a virtual tape library (VTL) system in accordance with an exemplary embodiment of the present invention. In a current exemplary embodiment of the present invention, the method 1000 may include the step of receiving a first write command 1002. The method 1000 may further include the step of, based upon said received first write command, writing a first data set to a first portion of Logical Block Addressing (LBA) space of a virtual tape drive of the VTL system 1004. The method 1000 may further include the step of mapping the first portion of LBA space of the virtual tape drive to physical storage of the VTL system 1006. The method 1000 may further include the step of receiving a second write command 1008. The method 1000 may further include the step of, based upon said received second write command, writing a second data set to a second portion of LBA space of the virtual tape drive of the VTL system 1010. The method 1000 may further include the step of mapping the second portion of LBA space of the virtual tape drive to physical storage of the VTL system 1012. The method 1000 may further include the step of receiving a third write command 1014. The method 1000 may further include the step of, based upon said received third write command, writing a third data set to the first portion of LBA space, wherein writing the third data set to the first portion of LBA space includes overwriting at least a portion of the first data set 1016. The method 1000 may further include the step of unmapping from physical storage at least one of: LBA space occupied by non-overwritten data of the first data set; and LBA space occupied by the second data set 1018.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium/computer-readable storage medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for utilizing Small Computer System Interface (SCSI) commands in a virtual tape library (VTL) system, comprising:
    writing a first data set to a first portion of Logical Block Addressing (LBA) space of a virtual tape drive of the VTL system;
    mapping the first portion of LBA space of the virtual tape drive to physical storage of the VTL system;
    writing a second data set to a second portion of the LBA space of the virtual tape drive of the VTL system;
    mapping the second portion of LBA space of the virtual tape drive to physical storage of the VTL system;
    writing a third data set to the first portion of LBA space, wherein writing the third data set to the first portion of LBA space includes overwriting at least a portion of the first data set at the first portion of LBA space without overwriting the second data set at the second portion of the LBA space;
    determining that the unoverwritten second data set at the second portion of LBA space is invalid when at least the portion of the first data set at the first portion of LBA space is overwritten; and
    responsive to determining that the second data set at the second portion of LBA space is invalid, implicitly unmapping the second portion of LBA space of the virtual tape drive from physical storage of the VTL system without receiving an explicit unmap command from an initiator that initiated the writing of the third data set at the first portion of LBA space.

2. A method as claimed in claim 1, wherein the VTL system supports thin-provisioning.

3. A non-transitory computer-readable medium having computer-executable instructions for performing a method for utilizing Small Computer System Interface (SCSI) commands in a virtual tape library (VTL) system, said method comprising:
    receiving a first write command via a storage interface;
    based upon the received first write command, writing a first data set to a first portion of Logical Block Addressing (LBA) space of a virtual tape drive of the VTL system;
    mapping the first portion of LBA space of the virtual tape drive to physical storage of the VTL system; and
    receiving a second write command via the storage interface;
    based upon the received second write command, writing a second data set to a second portion of the LBA space of the virtual tape drive of the VTL system;
    mapping the second portion of LBA space of the virtual tape drive to physical storage of the VTL system;
    receiving a third write command via the storage interface;
    writing a third data set to the first portion of LBA space based upon the received third write command, wherein writing the third data set to the first portion of LBA space includes overwriting at least a portion of the first data set at the first portion of LBA space without overwriting the second data set at the second portion of LBA space;
    determining that an unoverwritten portion of the first data set at the first portion of LBA space and the second data set at the second portion of LBA space are invalid when the portion of the first data set at the first portion of LBA space is overwritten; and
    responsive to determining that the unoverwritten portion of the first data set at the first portion of LBA space and the unoverwritten second data set at the second portion of LBA space are invalid, implicitly unmapping the first portion of the LBA space of the virtual tape drive associated with the unoverwritten portion of the first data set from physical storage and implicitly unmapping the second portion of LBA space of the virtual tape drive associated with the unoverwritten second data set from physical storage of the VTL system without receiving an explicit unmap command from an initiator that initiated the writing of the third data set at the first portion of LBA space.

4. A non-transitory computer-readable medium as claimed in claim 3, wherein said VTL system supports thin provisioning.

5. A virtual tape library (VTL) system utilizing Small Computer System Interface (SCSI) commands, comprising:
    an array of disk drives;
    a storage controller, connected to the array of disk drives, the storage controller operable to:
        receive a first write command via the storage interface;
        write a first data set to a first portion of Logical Block Addressing (LBA) space of a virtual tape drive of the VTL system based upon the received first write command;
        map the first portion of LBA space of the virtual tape drive to the array of disk drives of the VTL system;
        receive a second write command via the storage interface;
        write a second data set to a second portion of LBA space of the virtual tape drive of the VTL system based upon the received second write command;
        map the second portion of LBA space of the virtual tape drive to the array of disk drives of the VTL system;
        receive a third write command via the storage interface;
        write a third data set, based upon the received third write command, to the first portion of LBA space, wherein writing the third data set to the first portion of LBA space includes overwriting at least a portion of the first data set at the first portion of LBA space without overwriting the second data set at the second portion of LBA space;
        determine that the unoverwritten second data set at the second portion of LBA space is invalid when at least the portion of the first data set at the first portion of LBA space is overwritten; and responsive to determining that the unoverwritten second data set at the second portion of LBA space is invalid, implicitly unmap the second portion of LBA space of the virtual tape drive from the array of disk drives of the VTL system without receiving an explicit unmap command from an initiator that initiated the writing of the third data set at the first portion of LBA space.

6. A VTL system as claimed in claim 5, wherein the VTL system is a thin-provisioning system.

7. A method for utilizing Small Computer System Interface (SCSI) commands in a virtual tape library (VTL) system, comprising:

writing a first data set to a first portion of a Logical Block Addressing (LBA) space of a virtual tape drive of the Virtual Tape Library (VTL) system;

mapping the first portion of the LBA space of the virtual tape drive;

writing a second data set to a second portion of the LBA space of the virtual tape drive of the VTL system such that the second data set overwrites at least a portion of the first data set at the first portion of the LBA space without overwriting a third data set at a third portion of the LBA space;

determining that the unoverwritten third data set at the third portion of the LBA space is invalid when at least the portion of the first data set at the first portion of LBA space is overwritten; and responsive to determining that the unoverwriitten third data set at the third portion of the LBA space is invalid, implicitly unmapping the third portion of the LBA space of the virtual tape drive associated with the invalid third data set, without receiving an explicit unmap command from an initiator that initiated the writing of the second data set at the first portion of LBA space.

8. A method as claimed in claim 1, wherein the physical storage comprises an array of disk drives.

9. A method as claimed in claim 1, wherein the third data set is initially written to an intermediate memory and thereafter the third dataset is sent via the storage interface to a controller of the VTL system.

10. A method as claimed in claim 9, wherein the controller of the VTL system controls the writing of the third data set to the first portion of LBA space.

11. A non-transitory computer-readable medium as claimed in claim 3, wherein the physical storage comprises an array of disk drives.

12. A non-transitory computer-readable medium as claimed in claim 3, wherein the third data set is first written to an intermediate memory and thereafter the third dataset is sent via the storage interface to a controller of the VTL system.

13. A non-transitory computer-readable medium as claimed in claim 12, wherein the controller of the VTL system controls the writing of the third data set to the first portion of LBA space.

14. A VTL system as claimed in claim 5, wherein the third data set is initially written to an intermediate memory and thereafter the third dataset is sent via the storage interface to a controller of the VTL system.

15. A VTL system as claimed in claim 14, wherein the controller of the VTL system controls the writing of the third data set to the first portion of LBA space.

16. A method as claimed in claim 7, wherein the physical storage comprises an array of memory devices.

17. A method as claimed in claim 7, wherein the second data set is initially written to an intermediate memory and thereafter the second dataset is sent via a storage interface to a controller of the VTL system.

18. A method as claimed in claim 17, wherein the controller of the VTL system controls the writing of the second data set to the second portion of the LBA space of the virtual tape drive of the VTL system.

\* \* \* \* \*